United States Patent
Rubin et al.

(10) Patent No.: US 7,281,272 B1
(45) Date of Patent: Oct. 9, 2007

(54) METHOD AND SYSTEM FOR COPYRIGHT PROTECTION OF DIGITAL IMAGES

(75) Inventors: Moshe Rubin, Rechov Shaulson (IL);
Andrew Goldman, Jerusalem (IL);
Daniel A. Schreiber, Beit Shemesh (IL)

(73) Assignee: Finjan Software Ltd., South Netanya (IL)

( * ) Notice: Subject to any disclaimer, the term of this patent is extended or adjusted under 35 U.S.C. 154(b) by 0 days.

(21) Appl. No.: 09/459,493

(22) Filed: Dec. 13, 1999

Related U.S. Application Data (63) Continuation-in-part of application No. 09/397,331, filed on Sep. 14, 1999, now Pat. No. 6,298,446, which is a continuation-in-part of application No. 09/313,067, filed on May 17, 1999, now Pat. No. 6,209,103.

(51) Int. Cl.
*G06F 21/00* (2006.01)

(52) U.S. Cl. .................. 726/26; 713/153; 380/203; 380/204; 380/205; 380/210; 345/530

(58) Field of Classification Search ............... 391/701; 380/3, 201, 54; 713/201; 711/104
See application file for complete search history.

(56) References Cited

U.S. PATENT DOCUMENTS

| | | | |
|---|---|---|---|
| 4,405,829 A | 9/1983 | Rivest et al. | |
| 4,827,508 A | 5/1989 | Shear | |
| 4,977,594 A | 12/1990 | Shear | |
| 5,012,232 A * | 4/1991 | Fadem | 345/25 |
| 5,050,213 A | 9/1991 | Shear | |
| 5,300,946 A * | 4/1994 | Patrick | 345/592 |
| 5,303,370 A | 4/1994 | Brosh et al. | |
| 5,410,598 A | 4/1995 | Shear | |
| 5,509,070 A | 4/1996 | Schull | |
| 5,533,124 A | 7/1996 | Smith et al. | |
| 5,570,306 A * | 10/1996 | Soo | 708/212 |
| 5,636,292 A | 6/1997 | Rhoads | |
| 5,638,513 A | 6/1997 | Ananda | |
| 5,642,207 A * | 6/1997 | Smitt | 358/474 |
| 5,710,834 A | 1/1998 | Rhoads | |
| 5,715,403 A | 2/1998 | Stefik | |

(Continued)

FOREIGN PATENT DOCUMENTS

WO    WO98/44424    10/1998

OTHER PUBLICATIONS

Wen-Nung Lie, Li-Chun Chang; "Data Hiding In Images With Adaptive Numbers Of Least Significant Bits Based On The Human Visual System", Oct. 1999, IEEE, pp. 286-290.*

(Continued)

*Primary Examiner*—Nasser Moazzami
*Assistant Examiner*—Carl Colin
(74) *Attorney, Agent, or Firm*—Perkins Coie LLP (57) ABSTRACT

A method and system for protecting digital images copied from a video RAM, including the steps of transmitting stored pixel data from a computer memory to a video RAM, identifying protected pixel data within the stored pixel data, modifying the stored pixel data, thereby generating modified pixel data within which individual pixel datum is recognizable as being protected or unprotected, and, in response to pixel data being copied from the video RAM, replacing individual pixel datum copied from the video RAM, that is protected, with substitute pixel datum.

74 Claims, 7 Drawing Sheets

U.S. PATENT DOCUMENTS

| | | | |
|---|---|---|---|
| 5,721,788 A | 2/1998 | Powell et al. | |
| 5,745,254 A * | 4/1998 | Satou | 358/412 |
| 5,745,360 A | 4/1998 | Leone et al. | |
| 5,745,604 A | 4/1998 | Rhoads | |
| 5,748,763 A | 5/1998 | Rhoads | |
| 5,748,783 A | 5/1998 | Rhoads | |
| 5,758,068 A | 5/1998 | Brandt et al. | |
| 5,764,770 A * | 6/1998 | Schipper et al. | 713/176 |
| 5,765,152 A | 6/1998 | Erickson | |
| 5,768,426 A | 6/1998 | Rhoads | |
| 5,781,914 A | 7/1998 | Stork et al. | |
| 5,801,679 A | 9/1998 | McCain | |
| 5,801,689 A | 9/1998 | Huntsman | |
| 5,809,160 A | 9/1998 | Powell et al. | |
| 5,822,436 A | 10/1998 | Rhoads | |
| 5,832,119 A | 11/1998 | Rhoads | |
| 5,835,722 A | 11/1998 | Bradshaw et al. | |
| 5,838,902 A | 11/1998 | Shin | |
| 5,841,886 A | 11/1998 | Rhoads | |
| 5,841,978 A | 11/1998 | Rhoads | |
| 5,850,481 A | 12/1998 | Rhoads | |
| 5,862,260 A | 1/1999 | Rhoads | |
| 5,870,544 A | 2/1999 | Curtis | |
| 5,872,915 A | 2/1999 | Dykes et al. | |
| 5,875,249 A * | 2/1999 | Mintzer et al. | 380/54 |
| 5,881,287 A * | 3/1999 | Mast | 717/127 |
| 5,892,900 A | 4/1999 | Ginter et al. | |
| 5,893,101 A * | 4/1999 | Balogh et al. | 707/100 |
| 5,905,505 A | 5/1999 | Lesk | |
| 5,920,848 A | 7/1999 | Schutzer et al. | 705/42 |
| 5,968,119 A | 10/1999 | Stedman et al. | |
| 5,974,441 A | 10/1999 | Rogers et al. | 709/200 |
| 5,982,931 A | 11/1999 | Ishimaru | |
| 5,986,676 A * | 11/1999 | Dwin et al. | 345/544 |
| 5,991,399 A | 11/1999 | Graunke et al. | |
| 5,999,941 A | 12/1999 | Andersen | 707/103 |
| 6,009,410 A | 12/1999 | LeMole et al. | |
| 6,011,905 A | 1/2000 | Huttenlocher et al. | |
| 6,014,702 A | 1/2000 | King et al. | |
| 6,032,150 A | 2/2000 | Nguyen | |
| 6,038,031 A * | 3/2000 | Murphy | 382/254 |
| 6,088,355 A * | 7/2000 | Mills et al. | 370/392 |
| 6,205,480 B1 | 3/2001 | Broadhurst et al. | 709/225 |
| 6,212,329 B1 * | 4/2001 | Sugahara | 386/94 |
| 6,236,387 B1 | 5/2001 | Imada | |
| 6,240,450 B1 | 5/2001 | Sharples et al. | 709/224 |
| 6,260,141 B1 | 7/2001 | Park | 713/155 |
| 6,275,599 B1 * | 8/2001 | Adler et al. | 382/100 |
| 6,282,362 B1 * | 8/2001 | Murphy et al. | 386/46 |
| 6,343,274 B1 | 1/2002 | McCollom et al. | |
| 6,343,738 B1 | 2/2002 | Ogilvie | |
| 6,463,467 B1 * | 10/2002 | Mages et al. | 709/218 |
| 6,557,103 B1 * | 4/2003 | Boncelet et al. | 713/176 |
| 6,601,108 B1 | 7/2003 | Marmor | |
| 6,661,904 B1 * | 12/2003 | Sasich et al. | 382/100 |
| 6,664,969 B1 * | 12/2003 | Emerson et al. | 345/544 |
| 6,668,246 B1 * | 12/2003 | Yeung et al. | 705/57 |
| 6,804,452 B1 * | 10/2004 | Kuroda et al. | 386/94 |
| 6,877,005 B2 * | 4/2005 | Hunter et al. | 707/10 |
| 2002/0156742 A1 * | 10/2002 | Ogino et al. | 705/57 |

OTHER PUBLICATIONS

Duncan Sellers "An Introduction to Steganography" http://www.totse.com/en/privacy/encryption/163947.html; pp. 1-18.*
Chaper 3—Understanding Image Guardian—3 pages.
Chaper 3 -Understanding Web referee—3 pages.
"Copysight", http://www.ip2.com.
"Copysight: Now You Can Protect Your Website Content on the Internet with Copysight's Suite of Software and Business Solutions", (http://www.ip2.com), 1999.
Digimarc & Copyright Protection (http://www.digimarc.com), 1999.
"Digital Rights Management" http://www.inertrust.com.
"SafeImage", http://www.safemedia.com.
"SiteShield" press release, http://www.maximized.com/press/960529-1.html.
"SiteShield" product details, http://www.maximized.com/products/siteshield/why.html.
"Softlock.Com". http://www.softlock.com.
Strom, D., "Browser: Protect Your Image on the Web", 1998 (http://www.zdnet.com).
Stirland, Sarah; ActiveX vs. Java, Wall Street & Technology, vol. 15, No. 8, p. 48, Aug. 1997.
Mynatt et al. "Nonvisual Presentation of Graphical User Interfaces: Contrasting Two Approaches"; 1994, ACM, pp. 166-172.

* cited by examiner

METHOD AND SYSTEM FOR COPYRIGHT PROTECTION OF DIGITAL IMAGES

This application is a continuation-in-part of assignee's application U.S. Ser. No. 09/397,331, now U.S. Pat. No. 6,298,446, filed on Sep. 14, 1999, entitled "Method and System for Copyright Protection of Digital Images Transmitted over Networks.", which is a continuation-in-part of U.S. Ser. No. 09/313,067, filed on May 17, 1999, now U.S. Pat. No. 6,209,103, entitled "Method and System for Copyright Protection of Digital Images Transmitted Over Networks".

FIELD OF THE INVENTION

The present invention relates to copyright protection of digital data.

BACKGROUND OF THE INVENTION

Software copyright protection is a central concern in software development, and in copyright law itself. Typically, software is distributed in shrink-wrap packages containing diskettes and/or CD-ROMs, and by download over the Internet via ftp servers. Protecting software from rampant unauthorized copying, distribution and use ("software piracy") is one of the most challenging problems facing the software industry.

Over the past years, several techniques have been developed for combating software piracy. These include use of hardware plugs, use of license keys, use of tokens and sophisticated encryption systems.

One of the leading technologies for controlling use of software within turnkey transaction systems is the Digital Rights Management system of InterTrust® Technologies Corp. of Sunnyvale, Calif., as described in U.S. Pat. Nos. 5,892,900, 5,410,598, 5,050,213, 4,977,594 and 4,827,508.

Another leading technology is the CyberSales Solution™ of SoftLock.com, Inc. of Maynard, Mass., as described in U.S. Pat. No. 5,509,070. CyberSales Solution provides locking and unlocking functionality so that content can be securely previewed by consumers, electronically purchased and redistributed, and it protects the content in an initial transaction and in subsequent information pass-along. Content providers can control how much information is available without paying, and disable, or additionally charge for, the ability to print or cut and paste. CyberSales Solution handles secure transactions, remittance processing, reports, audits and customer service.

With the advent of the use of compelling multi-media on web pages accessible over the Internet, protection of digital images and other media is becoming increasingly critical. Web designers are reluctant to use valuable digital "works of art" knowing that users can easily copy them onto their own computers, and use them for their own unauthorized purposes. Moreover, anyone using a web browser to view an image posted on the Internet can easily copy the image by simply positioning a mouse pointer over the displayed image, clicking on the right mouse button and selecting a "Save Image As . . . " command. Copyright and piracy issues are of major concern to web publishers.

Prior art techniques for protecting digital images include the embedding of invisible digital watermarks within images, so that copies of protected images can be identified and traced. Digimarc Corporation of Lake Oswego, Oreg. embeds hidden messages within pixel data for identifying protected images, and tracks their distribution over the Internet to monitor potential copyright infringement. Digimarc images carry unique IDs that link to predetermined locations on the web. Digimarc images are compatible with standard image formats, such as JPEG, and can be opened and displayed by standard image readers. However, when opened with a Digimarc reader, the images are displayed together with a "Web look up" button that enables a user to identify the sources of the images. Digimarc technology is described in U.S. Pat. Nos. 5,862,260, 5,850,481, 5,841,978, 5,841,886, 5,832,119, 5,822,436, 5,809,160, 5,768,426, 5,765,152, 5,748,783, 5,748,763, 5,745,604, 5,721,788, 5,710,834 and 5,636,292.

These techniques are useful in thwarting digital image piracy to the extent that they trace pirated content, but they do not prevent unauthorized copying of digital images in the first place.

Other prior art techniques require a webmaster to modify images residing on a server computer in order to protect them. The webmaster is also required to modify his web pages accordingly, so as to reference the modified images. SafeMedia™ is a software product of Internet Expression, Inc. of Exton, Pa. that converts images from a standard format such as JPEG into a SIF (Safe Image Format). SIF images can only be viewed with a SafeMedia Java viewer. SafeMedia embeds a host or domain name into an image, and checks that the image is located on the web site it was intended for. SafeMedia also includes enhanced system control for preventing screen capture by disabling a clipboard.

These prior art techniques are difficult to embrace, since they require modification of all protected images on the web, as well as modification of the web pages that reference them. Furthermore the SIF Java viewer has the limitation of only being able to load images from the same server that the viewer came from.

Other prior art techniques for protecting digital images use Java applets within web browsers to disable the menu that pops up when a user right clicks on a displayed image within his web browser. Copysight® is a software application of Intellectual Protocols, LLC of Nanuet, N.Y. that uses digital watermarking and fingerprinting to protect images, and includes a Java applet that disables the ability to save displayed images within a web browser and the ability to print them. Copysight operates by converting unprotected files to protected files that are encrypted and that contain digital fingerprints. Copysight also tracks distribution of protected images across the Internet, and issues reports of potential copyright infringement.

These prior art techniques disable unauthorized copying of digital images from within web browsers, but they do not protect the images from being copied by an application external to the web browser. For example, they do not prevent a user from copying digital images displayed in his web browser by means of an application running external to the web browser, such as an image editing tool, or by means of a Print Screen or other such command that serves to capture contents of a video RAM to a clipboard. Thus a Java applet that prevents unauthorized copying of digital images from within Netscape Communicator or Internet Explorer can be circumvented by a user pressing on a Print Screen button of his keyboard, or by a user copying and pasting from a window of his web browser to a window of another software application.

SUMMARY OF THE INVENTION

The present invention provides a method and system for enabling a user to view protected image data using his web browser without being able to copy it. The slogan "Look but Don't Touch™" has been adopted to describe the feature of the present invention that enables a user to view content without being able to successfully copy it into his computer.

The present invention is distinct from prior art methods in several respects. A first distinction is that the present invention displays an image to a user without downloading unmodified image data to the user's computer. Thus, unlike software piracy techniques that protect an original copy of software from being illegally copied, the present invention does not provide an original copy in the first place.

A second distinction is that the present invention prevents a user from copying a protected image both from within and from without his web browser. Specifically, the present invention blocks copying of an image from within his web browser, when a user selects the "Save Image As . . . " command and when a user prints the contents of a web browser window. It also blocks copying of an image from without when a user presses the "Print Screen" button of his keyboard or attempts to copy from his web browser window and paste onto a window of another application, or when a third party software application attempts to use the "Print Screen" command.

A third distinction is that the present invention provides hardware level protection, and prevents a user from capturing screen pixel data from a video RAM. At the hardware level, in order to display a protected image on a video monitor, original image pixel data is typically transmitted to the video RAM. The original pixel data is thus exposed. The present invention provides a mechanism whereby pixel data in the video RAM is altered in a subtle way so as to mark the pixel data according to whether or not it is part of a protected image. The marking is used to modify protected pixel data that is subsequently captured from the video RAM. In this way an image captured from screen data differs from a protected image being displayed on the screen.

There is thus provided in accordance with a preferred embodiment of the present invention a method for protecting digital images from being copied from a video RAM, including the steps of transmitting stored pixel data from a computer memory to a video RAM, identifying protected pixel data within the stored pixel data, modifying the stored pixel data, thereby generating modified pixel data within which individual pixel datum is recognizable as being protected or unprotected, and, in response to pixel data being copied from the video RAM, encrypting individual pixel datum copied from the video RAM, that is protected.

There is additionally provided in accordance with a preferred embodiment of the present invention a method for protecting digital images copied from a video RAM, including the steps of transmitting stored pixel data from a computer memory to a video RAM, identifying protected pixel data within the stored pixel data, modifying the stored pixel data, thereby generating modified pixel data within which individual pixel datum is recognizable as being protected or unprotected, copying pixel data from the video RAM, and replacing individual pixel datum copied from the video RAM, that is protected, with substitute pixel datum.

There is further provided in accordance with a preferred embodiment of the present invention a system for protecting digital images copied from a video RAM, including a first data bus in which stored pixel data is transmitted from a computer memory to a video RAM, a second data bus, in which pixel data is copied from the video RAM to a computer memory, a digital filter identifying protected pixel data within the stored pixel data, and modifying the stored pixel data, thereby generating modified pixel data within which individual pixel datum is recognizable as being protected or unprotected, and a digital encoder encrypting individual pixel datum copied from the video RAM that is protected.

There is yet further provided in accordance with a preferred embodiment of the present invention a system for protecting digital images copied from a video RAM, including a first data bus in which stored pixel data is transmitted from a computer memory to a video RAM, a second data bus, in which pixel data is copied from the video RAM to a computer memory, a digital filter identifying protected pixel data within the stored pixel data, and modifying the stored pixel data, thereby generating modified pixel data within which individual pixel datum is recognizable as being protected or unprotected, and a pixel processor replacing individual pixel datum copied from the video RAM, that is protected, with substitute pixel datum.

There is moreover provided in accordance with a preferred embodiment of the present invention a method for protecting digital images copied from a video RAM, including the steps of transmitting stored pixel data from a computer memory to a video RAM, identifying protected pixel data within the stored pixel data, and modifying the stored pixel data, thereby generating modified pixel data within which individual pixel datum is recognizable as being protected or unprotected.

There is additionally provided in accordance with a preferred embodiment of the present invention a system for protecting digital images copied from a video RAM, including a data bus in which stored pixel data is transmitted from a computer memory to a video RAM, and a digital filter identifying protected pixel data within the stored pixel data, and modifying the stored pixel data, thereby generating modified pixel data within which individual pixel datum is recognizable as being protected or unprotected.

There is further provided in accordance with a preferred embodiment of the present invention a method for protecting pixel data captured from a video RAM, the pixel data being such that individual pixel datum is recognizable as being protected or unprotected, including the step of encrypting individual pixel datum copied from the video RAM, that is protected, in response to pixel data being copied from the video RAM.

There is yet further provided in accordance with a preferred embodiment of the present invention a method for protecting pixel data captured from a video RAM, the pixel data being such that individual pixel datum is recognizable as being protected or unprotected, including the step of replacing individual pixel datum copied from the video RAM, that is protected, with substitute pixel datum, in response to pixel data being copied from the video RAM.

There is moreover provided in accordance with a preferred embodiment of the present invention a system for protecting pixel data captured from a video RAM, the pixel data being such that individual pixel datum is recognizable as being protected or unprotected, including a data bus, in which pixel data is copied from the video RAM to a computer memory, and a digital encoder encrypting individual pixel datum copied from the video RAM that is protected.

There is additionally provided in accordance with a preferred embodiment of the present invention a system for protecting pixel data captured from a video RAM, the pixel data being such that individual pixel datum is recognizable as being protected or unprotected, including a data bus, in which pixel data is copied from the video RAM to a computer memory, and a pixel processor replacing individual pixel datum copied from the video RAM, that is protected, with substitute pixel datum.

There is further provided in accordance with a preferred embodiment of the present invention a method for protecting digital images copied from a video RAM, including the steps of modifying protected pixel data so as to mark it as being protected, transmitting stored pixel data including the modified protected pixel data from a computer memory to a video RAM, and, in response to pixel data being copied from the video RAM, replacing individual pixel datum copied from the video RAM, that is marked, with substitute pixel datum.

There is yet further provided in accordance with a preferred embodiment of the present invention a system for protecting digital images copied from a video RAM, including a first pixel processor modifying protected pixel data so as to mark it as being protected, a first data bus in which stored pixel data including the modified protected pixel data is transmitted from a computer memory to a video RAM, a second data bus, in which pixel data is copied from the video RAM to a computer memory, and a second pixel processor replacing individual pixel datum copied from the video RAM, that is marked, with substitute pixel datum.

BRIEF DESCRIPTION OF THE DRAWINGS

The present invention will be more fully understood and appreciated from the following detailed description, taken in conjunction with the drawings in which.

DETAILED DESCRIPTION OF A PREFERRED EMBODIMENT

The present invention concerns protection of digital images transmitted over a network, from unauthorized copying and use. Unlike prior art methods used to prevent software piracy, the present invention enables a user to view an image in his web browser without receiving original unmodified digital image data, and without being able to save the displayed image on his computer.

Typically, digital images are viewed over the Internet within web pages, such as hyper-text markup language (HTML) or extended markup language (XML) pages. Such web pages are electronic data files, stored on server computers, containing layout information for displaying text and graphics, and for running software applications such as Java applets. Typically, the data for the graphic objects, such as images, displayed within a web page is not contained within the web page file itself. Instead, the graphic objects reside elsewhere on the same server computer or other server computers, and the web page file contains references to the graphic objects. A reference to a graphic object specifies the network address of the computer containing the graphic object, such as an IP address, together with the directory path (relative to a prescribed root directory) and filename for the graphic object.

When a web browser in a client computer downloads a web page file, it parses the web page in order to display it on a video monitor. While parsing the web page, the web browser encounters the references to graphic objects, and in turn downloads the graphic objects. Downloading a web page file and the graphic objects it references is typically done through the HyperText Transfer Protocol (HTTP). Client requests for data on server computers are issued through HTTP requests, and data transmission from server to client is issued through HTTP responses.

After downloading the graphic objects, the web browser typically renders the web page with the graphic objects embedded therein, and displays it to the user on his video monitor. In turn, the user can interact with the displayed web page by clicking on hyper-links to other web pages, or by interacting with an application such as a Java applet.

In a preferred embodiment of the present invention, the image data that is transmitted from a server computer to a client computer is encrypted image data that is generated from the original image data by encoding it using an encryption algorithm. In this embodiment, additional software may be required by the web browser in order to decode the encrypted data, since a standard web browser typically supports only a limited number of image file formats, such as GIF and JPEG, and may not contain the decoder necessary to decrypt the encrypted image data. For the Netscape Communicator web browser of Netscape Communications, Inc. of Mountain View, Calif., such additional software may be a plug-in or a Java applet. For the Internet Explorer web browser of Microsoft Corporation of Redmond, Wash., such additional software may be an Active-X control or a Java applet. The additional software is used to decode the encrypted image data, and render it for display on a video monitor.

It may thus be appreciated that the present invention transmits encrypted image data for a protected image, through which a user views the protected image using his browser. The image data for the protected image is thus controlled for proper use, since it cannot be viewed without an appropriate decoder. However, whenever the user is permitted to view the protected image, such as when the user is browsing the image with his web browser, it is typically necessary to decode the encrypted image data in order for pixel data to be displayed by a display device such as a video monitor, since video hardware drivers typically process raw pixel data. The decoded image data is written to a video RAM, and thus the protected image data is exposed while the protected image is being displayed. Consequently there is a risk that the protected image can be captured from video RAM during display. This potential security leak needs to be addressed.

It is noted that pixel data in the video RAM includes data for an entire display screen. Thus, it can include both pixel data for protected images as well as pixel data for other parts of the screen.

Assignee's co-pending application U.S. Ser. No. 09/730, 326, filed on Sep. 14, 1999, and entitled "METHOD AND SYSTEM FOR COPYRIGHT PROTECTION OF DIGITAL IMAGES TRANSMITTED OVER NETWORKS"

addresses the above security leak by patching Windows API functions used to access pixel data within the video RAM, such as the familiar BitBlt, StretchBlt, PlgBlt, GetPixel and GDI32 functions. The patches enable additional pixel processing instructions to be performed within the Windows API functions, prior to pixel data being returned by these functions. As such, the patches thus enable the Windows API functions to replace original pixel data with substitute pixel data within the image that gets captured. For example, the captured image could be an encrypted version of the original protected image, a watermarked version of the original protected image, or a prescribed substitute image. As a result, although the original protected image is delivered to the display device, and the user is able to view the original image, nevertheless the image that gets captured from the video RAM is different than the original protected image.

The approach described above, using patched Windows API functions, works well as long as (i) the image capture operations that attempt to capture image data from video RAM are processed through these API functions, and (ii) the patched API functions successfully intercept the image capture operations.

There are, however, alternative ways to capture image data from video RAM, without use of Windows API functions, as described hereinbelow. Furthermore, there are ways to capture image data from video RAM using Windows API functions, but circumventing or disabling the patched Windows API functions. It is thus desirable to have a protection system that is connected closer to the video RAM than are the Windows API functions.

There are several ways to capture screen data from a video RAM. For example, (i) Windows API functions: As mentioned hereinabove, the Windows operating system of Microsoft Corporation of Redmond, Wash., provides system functions, such as the familiar BitBlt, StretchBlt, PlgBlt, GetPixel and GDI32 functions, for accessing pixel data within the video RAM.
(ii) Windows high-level functions: Windows provides high level functions, such as the "Print Screen" function, which serve to copy data from the video RAM to another memory buffer, such as a clipboard.
(iii) DirectDraw: Screen pixels can be captured using Direct-Draw graphics methods. (DirectDraw circumvents Windows API functions.)
(iv) Video grabber card: One can use a video grabber card to capture the screen.

DirectDraw and video grabber cards can capture screen data without use of Windows API functions. As such, the captured screen data cannot be altered by patching Windows API functions.

Furthermore, even when Windows API functions are used to capture screen data, the patched API functions can be circumvented or disabled. For example, (i) Un-patching functions patched by the copyright protection system: A software application can restore API functions, such as BitBlt, to their original un-patched state, and capture the screen undetected.
(ii) Patching the same functions as those patched by the copyright protection system: Microsoft and Lotus have camcorder programs that patch the same API functions as the present invention. If such camcorder programs begin executing after the copyright protection system of the present invention begins its execution, they effectively un-patch the functions patched by the present invention.
(iii) Remote access programs: Remote access programs, such as PCAnywhere, bypass the copyright protection system, and display protected images on a remote computer. The remote client can then capture such images at will.
(iv) Emulating patched code: If a software application emulates the Windows API functions patched by the copyright protection system, it can emulate the patched assembly instructions in its process space, and jump to the next un-patched instruction.
(v) Screen capture with no message loops: For Windows NT, the present invention relies on injecting a hook DLL into all process spaces. A software application without a message loop will not get injected.
(vi) Preventing the copyright protection system from installing system-wide hooks. A software application can intercept the Windows API SetWindowsHookEx function, and prevent the copyright protection system from hooking.
(vii) Non-erase background windows: A software application that does not handle the WM_ERASEBKGND message will have its client area filled.

In a preferred embodiment, the present invention overcomes these shortcomings by providing a protection method and system that is connected closer to the video RAM. The method and system of the present invention preferably marks screen pixel data that is sent to the video RAM, so as to distinguish between pixel data in the screen that originates from protected images, and other pixel data in the screen. In a preferred embodiment, each pixel datum is marked by setting the least significant bit of a blue color component to 0 or 1, where, for example, 0 indicates that the pixel datum is protected, and 1 indicates that it is not protected. Typically, pixel data includes one or more color components. For example, 24-bit RGB pixel data contains an 8-bit red color component, an 8-bit green color component and an 8-bit blue color component. Each color component is thus seen to have an integer decimal value between 0 and 255, where 0 usually represents the absence of the color, and 255 represents the highest presence of the color.

For example, if a blue component of a 24-bit pixel datum has a decimal value of 118, then its 8-bit representation is 01110110. In this 8-bit representation, the most significant bit is on the left, and the least significant bit is on the right. If the pixel datum is part of a protected image, then the least significant bit of the blue component is set to 0 (as happens to be its current value), producing 01110110. If the pixel datum is not part of a protected image, then the least significant bit of the blue component is set to 1, producing 01110111 (corresponding to the decimal value 119). The red and green components are not altered. The change in blue color value from 118 and 119 is slight enough that it is not discernible by the naked eye, upon display.

Similarly, if a blue component of a 24-bit pixel datum has a decimal value of 79, then its 8-bit representation is 01001111. If the pixel datum is part of a protected image, then the least significant bit of the blue component is set to 0, producing 01001110 (corresponding to the decimal value 78). If the pixel datum is not part of a protected image, then the least significant bit of the blue component is set to 1 (as happens to be its current value), producing 01001111. The red and green components are not altered. The change in blue color value from 79 to 78 is slight enough that it is not discernible by the naked eye, upon display.

It can thus be appreciated that the present invention enables pixel data to be marked, so as to distinguish pixel data belonging to protected images from other pixel data. It can be further appreciated that the marking does not noticeably alter the appearance of the pixel data upon display.

It is apparent to those skilled in the art that a similar marking can be used with 32-bit pixel data, or 16-bit pixel data, or 15-bit pixel data, or any other pixel data format that carries bits representing values of one or more color components.

When marked pixel data is copied from the video RAM, the present invention preferably uses the marking to identify protected pixel data. Pixel data that is protected can be modified, such as by encryption, so that when it is written to the user's clipboard, or another memory location, the user cannot use it to successfully display the original protected image.

Marked pixel data for a protected image can be modified in several ways, such as: (i) by encryption, (ii) by substituting pixel data of another prescribed image, possibly unrelated to the protected image, for the pixel data of the protected image, (iii) by substituting pixel data for watermarks, to generate watermarks over parts of the protected image, or (iv) by substituting pixel data for overlays, to block out parts of the protected image.

For users who have appropriate copyright permission to use a protected image, the marked data can be copied from the video RAM unmodified, along with the unmarked data. Alternatively, the protective image can be marked as unprotected from the outset, or, in some circumstances as appropriate, the entire marking can be by-passed, so that the original pixel data is copied to the video RAM without any marking modifications. Alternatively, if the captured image is encrypted, such users can be provided with a viewer that can decode the encrypted image.

Figure 1:
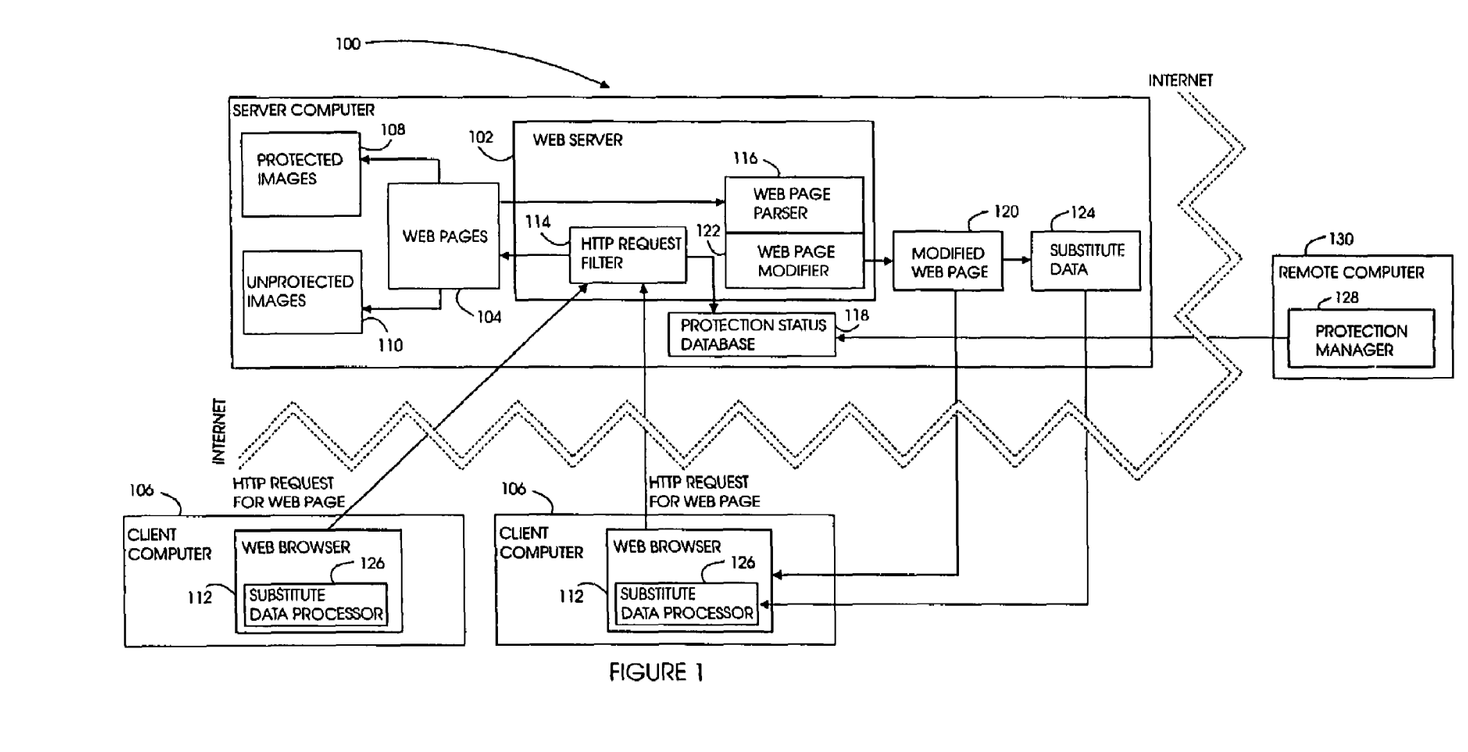
FIG. 1 is a simplified illustration of a system for copyright protection of digital images for use within a distributed server-client computing environment, in accordance with a preferred embodiment of the present invention.

Reference is now made to FIG. 1, which is a simplified illustration of a system for copyright protection of digital images for use within a distributed server-client computing environment, in accordance with a preferred embodiment of the present invention. A server computer 100 typically includes web server software 102 that serves web pages 104 to a plurality of client computers 106 over the Internet. Web pages 104 typically contain references to images that are to be embedded within the pages when the pages are rendered on client computers 106. The images referenced in web pages 104 typically reside on server computer 100, although they may reside on other computers as well.

Some of the images referenced in web pages 104 are preferably designated as protected images 108, which the owners desire to protect from unauthorized copying or use. Others of the images referenced in web pages 104 are designated as unprotected images 110, which the owners are not concerned about protecting from unauthorized copying or use. Designation of images as protected or unprotected is typically done by the owners of the images. For example, images may be designated as protected images when they contain significant creative content, and images may be designated as unprotected images when they contain little or no creative content, it being understood that other criteria can be used alone or in combination as a basis for distinguishing between protected and unprotected images.

Client computers 106 typically use web browser software 112 to access web pages stored on server computers 100, over the Internet. A web browser 112 requests a web page 104 from a server computer 100 by issuing an HTTP request. An HTTP request arriving at server computer 100 is processed by web server software 102.

In a preferred embodiment of the present invention, an incoming HTTP request to server computer 100 is routed to an HTTP request filter 114. HTTP filter 114 accesses the requested web page 104 and parses it using a web page parser 116, to identify the images that are referenced therewithin. Server computer 100 maintains a protection status database 118 that stores a protection status (protected/unprotected) for each image residing on server computer 100. HTTP filter 114 determines the protection status of each image referenced within web page 104, using protection status database 118.

An unprotected image 110 referenced within web page 104 is handled by web server software 102 in the normal fashion. Specifically, neither the reference to unprotected image 110 nor image 110 itself are modified. However, a protected image 108 referenced within web page 104 is handled differently. A modified web page 120 is generated by a web page modifier 122. Specifically, the reference to protected image 108 in web page 104 is modified by web page modifier 122 so as to reference substitute data 124.

Substitute data 124 preferably corresponds to an image that is visually identical or substantially similar to protected image 108. When substitute data 124 corresponds to an image that is visually identical to protected image 108, it is preferably an encrypted version of the protected image data. In a preferred embodiment of the present invention, the choice of what type of substitute data 124 to use depends on the owner's preference (e.g. whether or not to display an identical version of the protected image) and on the type of web browser 112 issuing the HTTP web page request from client computer 106.

Specifically, with regard to the type of web browser 112 issuing the HTTP web page request, web browsers 112 may include software that functions as a substitute data processor 126, in the form of a browser plug-in, Java applet or Active-X control. Such a substitute data processor is capable of rendering an encrypted image, and is also capable of preventing a user of client computer 106 from copying an image that is displayed by web browser 112.

When web browser 112 includes substitute data processor 126, substitute data 124 can be encrypted image data, or other image data in a format that would not be supported by a standard web browser 112 that does not include substitute data processor 126. Furthermore, when web browser 112 includes a substitute data processor 126, substitute data 124 can appear visually identical to protected image 108 when rendered by substitute data processor 126, and yet a user of client computer 106 is not able to copy or use it without authorization.

When web browser 112 does not include substitute data processor 126, substitute data 124 should be compatible with a standard web browser. For example, substitute data 124 can be a standard JPEG image. Alternatively, when web browser 112 does not include substitute data processor 126, substitute data 124 can be encrypted image data if modified web page 120 is generated so as to prompt client computer 106 to actively download substitute data processor 126 in order to display substitute data 124. This is typically the way in which web pages prompt a client computer to download Java applets, Active-X controls within Internet Explorer, and plug-ins utilizing the Smart Update feature within Netscape Communicator.

In a preferred embodiment of the present invention, the determination of which images on server computer 100 are protected images 108 and which images are unprotected images 110 is managed by a protection manager 128 residing on a remote computer 130, connected to server computer 100 by a network. It will be appreciated by those skilled in the art that protection manager 128 may reside on server computer 100, but the possibility of it residing on a remote computer 130 affords greater convenience to an administrator who can then administer server computer 100, and other server computers as well, remotely off-site.

Figure 2:
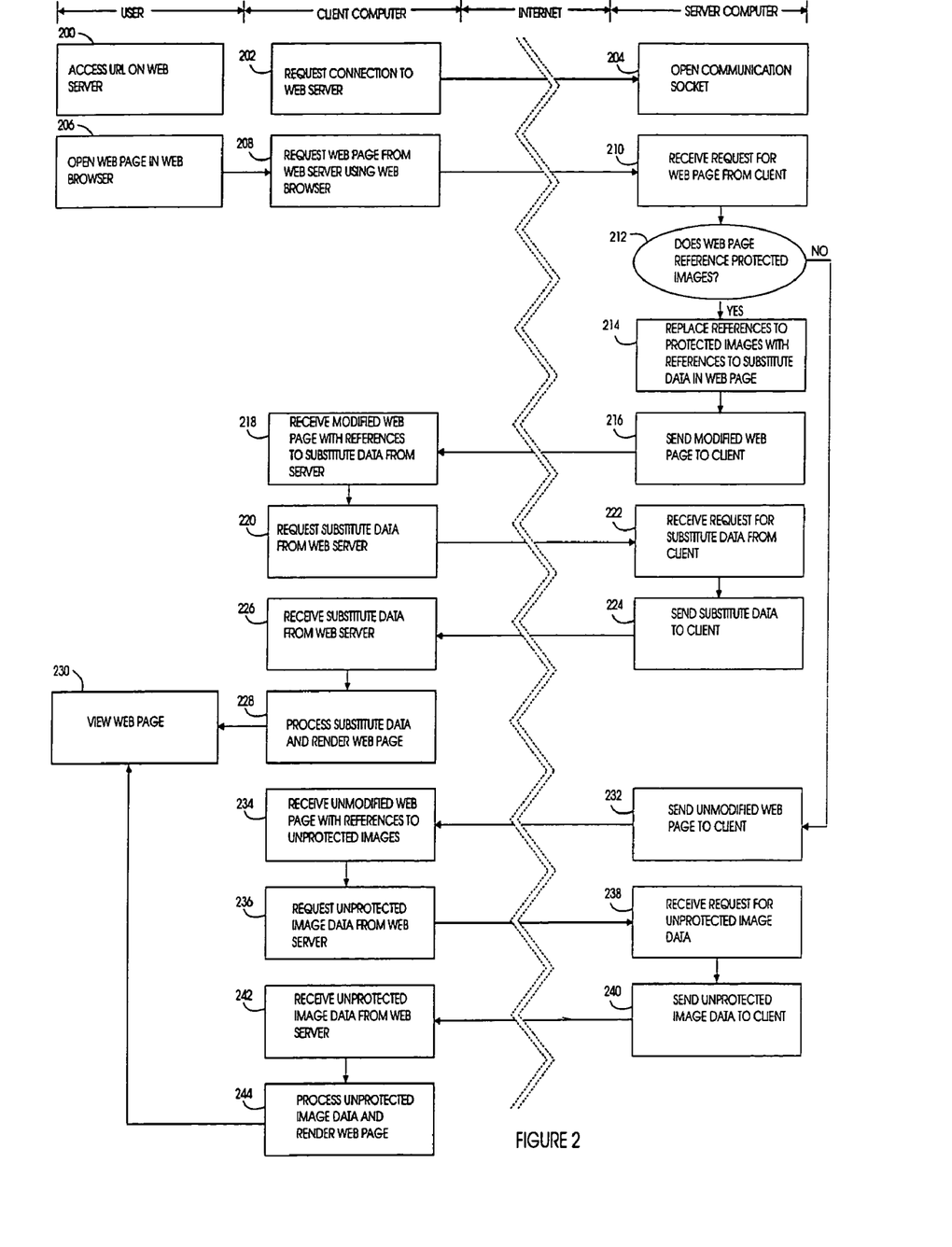
FIG. 2 is a simplified flowchart of a method for protecting digital images that are distributed within a server-client computing environment, in accordance with a preferred embodiment of the present invention.

Reference is now made to FIG. 2, which is a simplified flowchart of a method for protecting digital images that are distributed within a server-client computing environment, in accordance with a preferred embodiment of the present invention. The flowchart is divided into three columns. The leftmost column includes steps performed by a user, the second column from the left includes steps performed by a client computer, and the rightmost column includes steps performed by a server computer connected to the client computer over the Internet or such other network of computers.

At step 200 the user accesses a universal resource locator (URL) on a web server, using a web browser, and, in response, at step 202 the client computer requests a connection to the server computer. At step 204 the server computer opens a communication socket between the client computer and the server computer. At step 206 the user requests to open a web page using his web browser and, in response, at step 208 the client computer issues an HTTP request for the web page to a web server on the server computer, using the web browser. At step 210 the web server receives the HTTP request for the web page from the client computer.

In a preferred embodiment of the present invention, at step 212 the server computer searches a database to determine whether or not the web page being requested references protected images, or has protection tags. If so, it routes the incoming HTTP request to an HTTP request filter, as described hereinabove with respect to FIG. 1. The HTTP filter applies a web page parser to the requested web page and identifies the images referenced therewithin. At step 214 the server computer generates a modified web page in which references to the protected images are replaced with references to substitute data. The substitute data is preferably derived from the protected images. For example, the substitute data may be encrypted image data, obtained by applying an encryption algorithm to the protected image data. The modified web page is preferably a separate web page generated by a web page modifier, so that the original web page is preserved, as indicated in FIG. 1. Alternatively, the substitute references may be incorporated directly into the original web page, without generation of a separate modified web page.

At step 216 the modified web page is sent back to the client computer within an HTTP response. At step 218 the client computer receives the modified web page containing references to substitute data, and the web browser begins to render the modified web page. In rendering the modified web page, the web browser encounters the references to the substitute data, and at step 220 the substitute data processor within the client computer issues to the web server an HTTP request for the substitute data. At step 222 the server computer receives the HTTP request for the substitute data, and at step 224 the server sends an HTTP response containing the substitute data to the client computer. At step 226 the client computer receives the HTTP response containing the requested substitute data, and at step 228 the client computer processes the substitute data using a substitute data processor, as described hereinabove with respect to FIG. 1, and renders the web page.

At step 230 the user views the web page he requested. It is thus appreciated that the present invention enables the user to view protected images without being able to download them to his computer in unmodified form. Instead, substitute data is downloaded, such as encrypted image data.

It the server computer determines at step 212 that the requested web page does not reference protected images and does not have protection tags, then the HTTP request is passed to the server without any parsing. In this case, the processing is much simpler, and proceeds in the normal manner. Specifically, a modified web page is not generated and substitute data is not used. Rather, at step 232 the unmodified web page is sent to the client computer within an HTTP response. At step 234 the client computer receives the HTTP response containing the unmodified web page, and the web browser begins to render the web page. In rendering the web page, the web browser encounters the references to unprotected images, and at step 236 the client computer issues an HTTP request for the unprotected images to the web server. At step 238 the server computer receives the HTTP request for the unprotected images, and, in response, at step 240 the server computer sends an HTTP response containing the unprotected images. At step 242 the client computer receives the HTTP response with the unprotected image data, and at step 244 the web browser processes the unprotected images and renders them with the web page.

At step 230 the user views the web page he requested. It is thus appreciated that the unprotected image data is downloaded to the client computer as unmodified data, and is therefore susceptible to unauthorized copying or use.

Figure 3A:
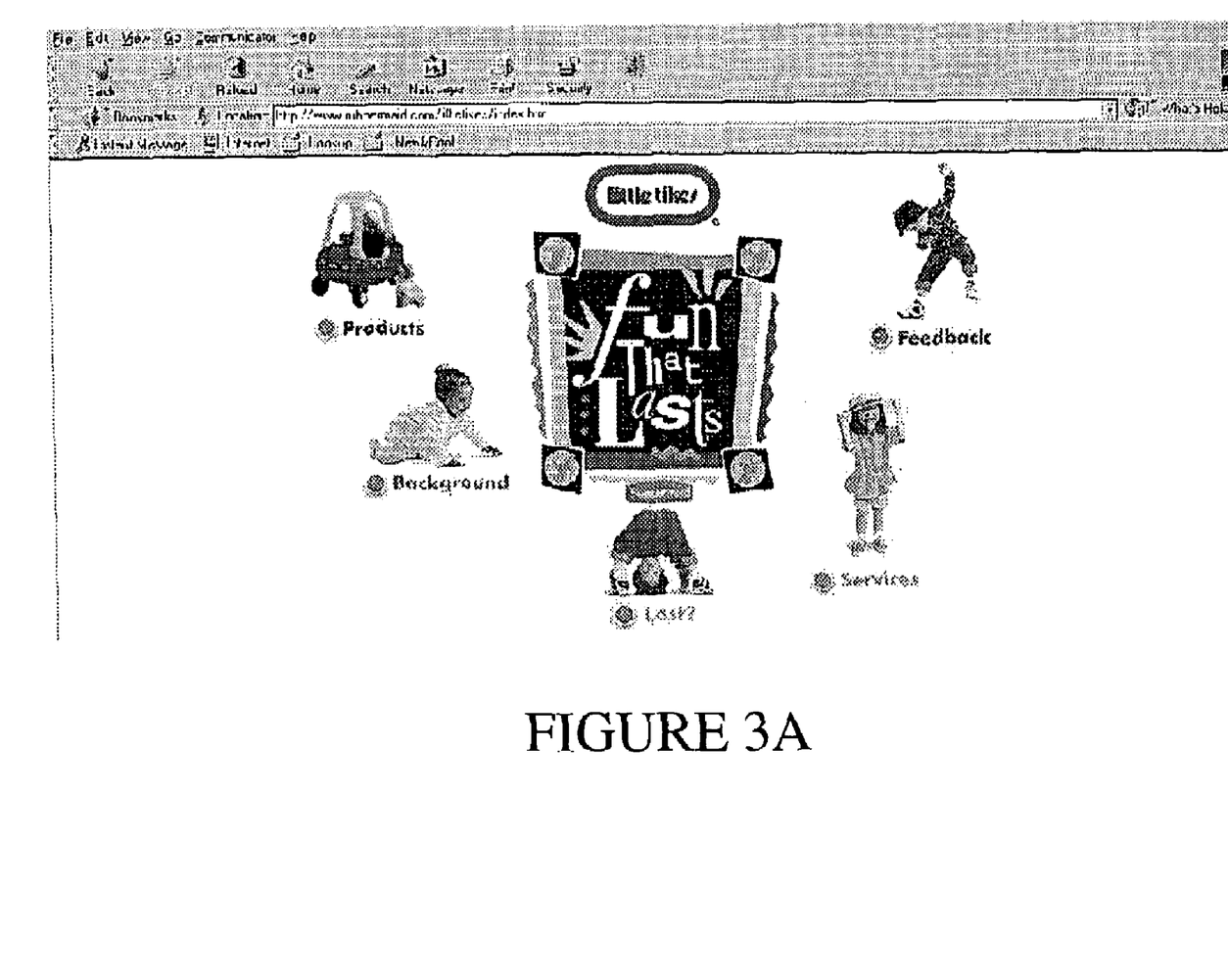
FIG. 3A is an illustration of a web page containing protected images, being displayed as a screen on a display device.
Figure 3B:
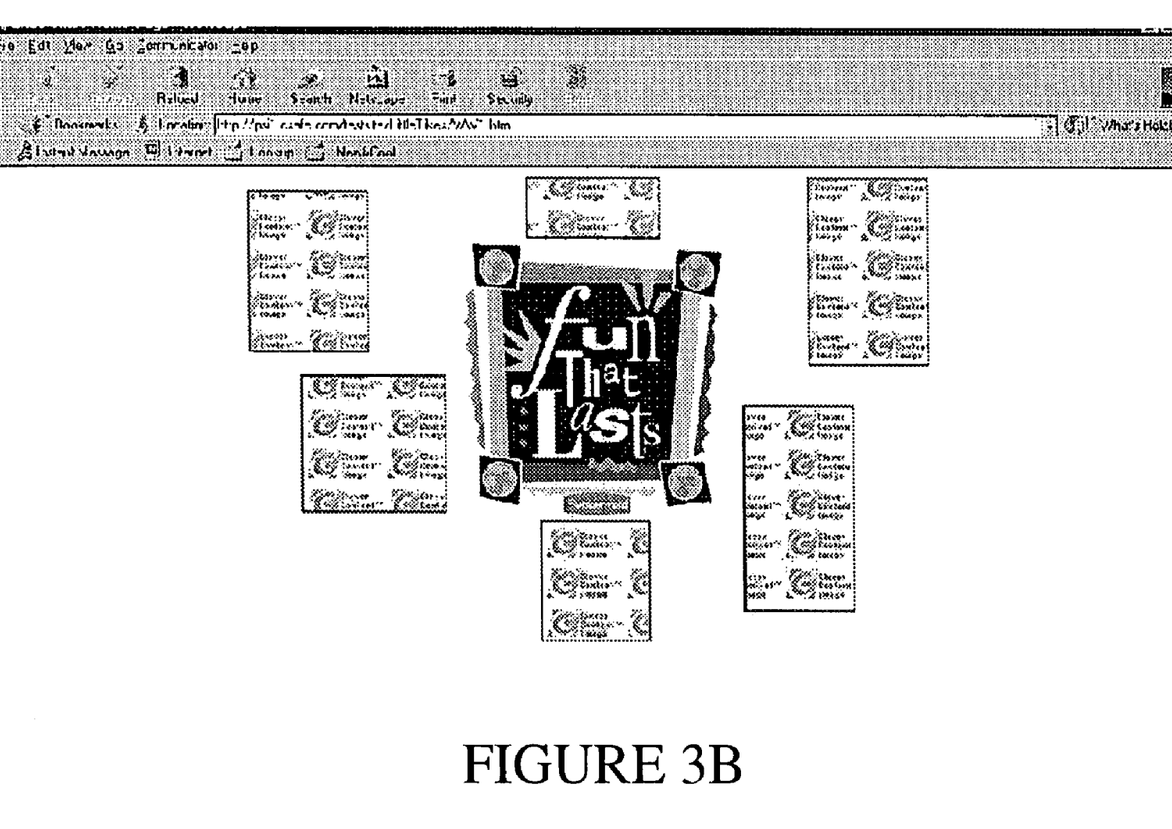
FIG. 3B is an illustration of the resulting captured image, generated by a preferred embodiment of the present invention, when a user copies screen data from a video RAM.

Reference is now made to FIG. 3A which is an illustration of a web page containing protected images, being displayed as a screen on a display device, and FIG. 3B which is an illustration of the resulting captured image, generated by a preferred embodiment of the present invention, when a user copies screen data from a video RAM. The various images surrounding the "fun That Lasts" logo in FIG. 3A are protected images. Typically, when a user presses the "Print Scrn" key, the contents being displayed on the screen are copied to a clipboard, and the user can subsequently paste such contents into a document from another application, such as an image or word processing application.

However, when a preferred embodiment of the present invention is operative, instead of capturing the original contents of the screen, substitute pixel data is substituted into the captured pixel data, resulting in the image illustrated in FIG. 3B. Observe that each of the protected images in the web page of FIG. 3A has been replaced with "Clever Content" block overlays. Observe further that the other unprotected contents of the screen, such as the "fun That Lasts" logo, are not modified and are captured faithfully.

Figure 4:
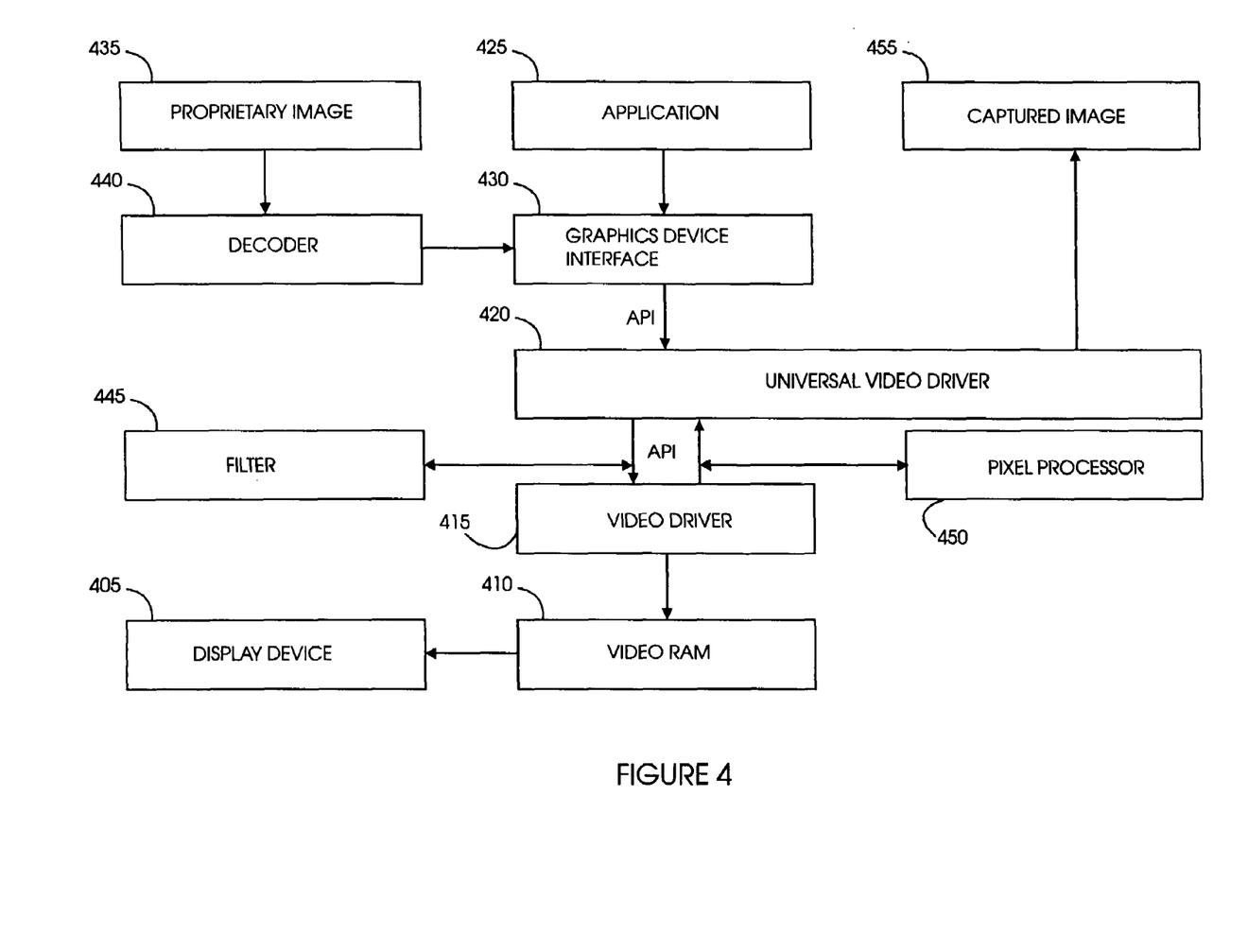
FIG. 4 is a simplified block diagram of a system for marking pixel data sent to a video RAM for display, in accordance with a preferred embodiment of the present invention.

Reference is now made to FIG. 4, which is a simplified block diagram of a system for marking pixel data sent to a video RAM for display, in accordance with a preferred embodiment of the present invention. A raster display device 405 displays screen pixel data on a video monitor screen. The screen pixel data being displayed is stored in a video RAM 410. Data transmitted in and out of video RAM 410 is controlled by a video driver 415. Video driver 415 is typically specific to a particular video card manufacturer.

In order to save developers the task of supporting all or many of the different available video drivers 415, Microsoft provides, within its Windows operating system, a universal video driver 420 that serves as an intermediary between a developer of a graphics application 425 and video driver 415. Universal video driver 420 essentially provides a standard programming interface that video card manufacturers and graphics applications developers both support.

Preferably, graphics application 425 includes a viewer that displays protected images. When graphics application 425 displays an image, such as a protected image 435, using a graphics device interface 430, it sends appropriate instructions to universal video driver 420. Similarly, when a web browser such as web browser 112 (FIG. 1) displays an image, such as protected image 435, it sends appropriate instructions to universal video driver 420.

The pixel data that gets sent to universal video driver 420 is typically raw pixel data, for writing to video RAM 410. If protected image 435 is encrypted, it must first be decoded by decoder 440 prior to being received by graphics device interface 430. The decoded data is thus exposed for copying.

Figure 6:
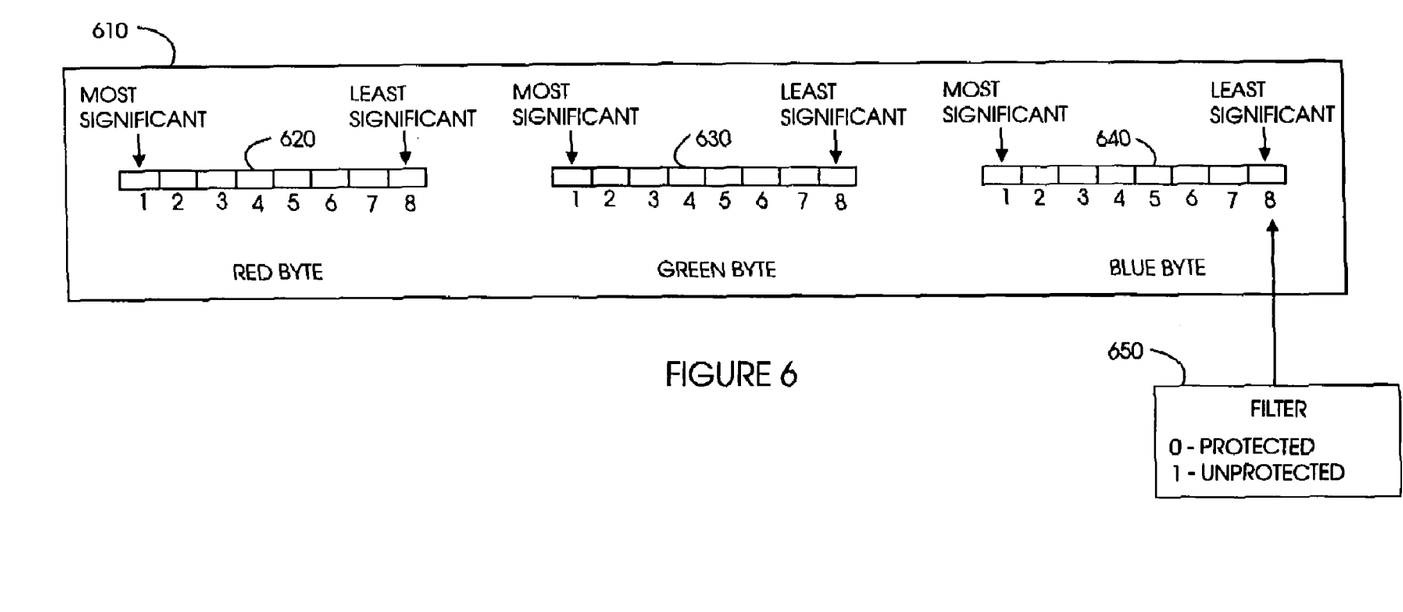
FIG. 6 is a simplified diagram of marked pixel data, for use in the system illustrated in FIG. 5.

In a preferred embodiment of the present invention, a filter 445 preprocesses all pixel data sent to universal video driver 420, so as to mark the pixel data in a way that distinguishes screen pixel data for protected images from other screen pixel data. Preferably, the marking is done in such as way as to set one or more specific bits of each pixel datum. FIG. 6 below illustrates one such method for marking pixel data. Preferably, the pixel data is marked in such as way as not to substantially alter its appearance on the screen when the pixel data is displayed.

When screen pixel data is subsequently captured from video RAM 410, it is processed by pixel processor 450. Pixel processor 450 identifies pixels that are marked, and replaces them with substitute pixel data, such as encrypted data or prescribed data, as mentioned hereinabove. Thus the image 455 that is captured is a substitute image containing substitute pixel data. Captured image 455 may be an encrypted image or a watermarked image or an image with overlays blocking out one or more image portions, such as the image illustrated in FIG. 3B.

It is apparent to those skilled in the art that filter 445 and pixel processor 450 may each be inserted at other points along the data flowpath from graphics device interface 430 to video ram 410. For example, one or both of them may be inserted between video driver 415 and video RAM 410.

The embodiment of the present invention described above uses a filter 445 that processes pixel data coming from an application layer. It is assumed that filter 445 knows how to mark each pixel as protected or unprotected. In an alternate embodiment of the present invention, filter 445 is not used, and graphics application 425, using the protected image viewer included therein, marks protected pixel data prior to sending it to graphics device interface 430 or universal video driver 420. Unprotected screen data is not altered, so that portions of its pixels may be interpreted by pixel processor 450 as being marked and other portions may be interpreted as being unmarked. As a result, when screen pixel data is subsequently captured from video RAM 410, it is likely that some unprotected pixels are replaced with substitute pixel data.

Figure 5:
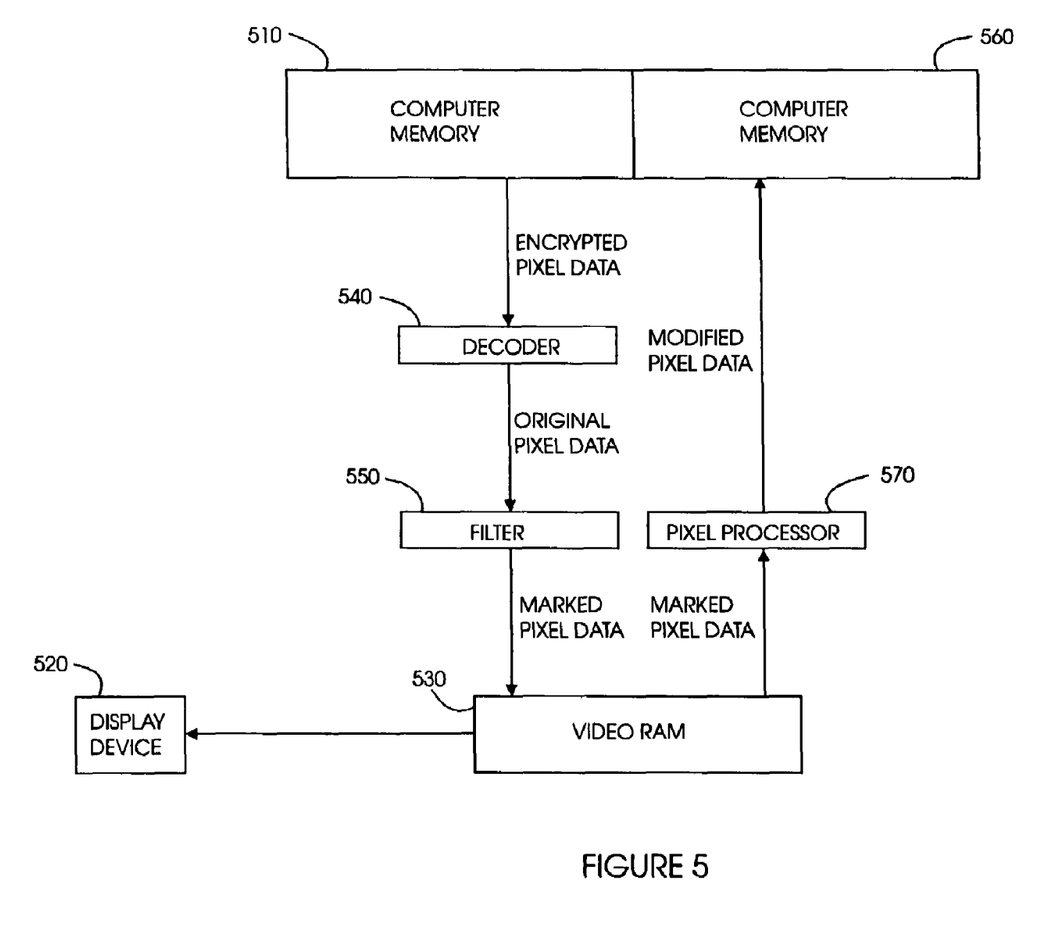
FIG. 5 is a simplified block diagram of a system for protecting digital images copied from a video RAM, in accordance with a preferred embodiment of the present invention.

Reference is now made to FIG. 5, which is a simplified block diagram of a system for protecting digital images copied from a video RAM, in accordance with a preferred embodiment of the present invention. A protected image is stored within a user's computer memory 510. The protected image is not in it original state, however—its pixel data is replaced with modified pixel data, such as encrypted pixel data. In order to display the protected image on raster display device 520, pixel data for the original image must be delivered to video RAM 530 in an unmodified state.

Video RAM 530 contains pixel data for a screen to be displayed on display device 520. Video hardware is used to rapidly set appropriate color values at each screen location on display device 520, based on the screen data in video RAM 530. Screen data typically includes portions that are protected image data, and portions that are not.

The modified pixel data stored in computer memory 510 is decoded by a decoder 540, to reproduce original pixel data. In a preferred embodiment of the present invention, the original pixel data is passed through a filter 550 before being written to video RAM 530. Filter 550 marks the screen pixel data in such a way as to distinguish pixel data for portions of the screen that correspond to protected images, from pixel data for other portions of the screen. The marking by filter 550 is necessary since typically some portions of screen data are protected, and other portions are not protected. For example, the screen data illustrated in FIG. 3A contains protected images surrounding the "fun That Lasts" logo, but the rest of the screen is not protected.

Marking is preferably accomplished by setting specific bits of pixel data, as described with reference to FIG. 6 hereinbelow. Preferably the marking is done in such a way as not to change the appearance of the image. The marked pixel data is then passed from filter 550 to video RAM 530, and displayed by display device 520.

FIG. 5 further illustrates what happens when an image is captured from video RAM 530 into a computer memory 560. The captured pixel data is passed through pixel processor 570. Since the pixel data in frame buffer 520 is marked, pixel processor 570 can distinguish between protected pixel data and unprotected pixel data. For example, pixel processor 570 can examine the bits that were set by filter 550, as described with reference to FIG. 6 hereinbelow.

Pixel processor 570 modifies each pixel datum that is marked as protected, to produce modified pixel data. For example, the modified pixel data produced by pixel processor 570 can be encrypted pixel data, or watermarked pixel data, or pixel data with overlays blocking out portions of a protected image, or pixel data for a prescribed substitute image. The modified pixel data is passed from pixel processor 570 to computer memory 560. The resulting effect is that the captured image is a modified image, different from the original protected images, such as the image illustrated in FIG. 3B; and the user cannot use the captured image to display the original image.

The protection system illustrated in FIG. 5 does not rely on the ability to intercept Windows API functions, and is thus connected closer to video RAM 530 than are the Windows API functions.

Reference is now made to FIG. 6, which is a simplified diagram of marked pixel data, for use in the system illustrated in FIG. 5. A single pixel datum 610 includes data for one or more color components. Illustrated in FIG. 6 is a pixel datum for a 24-bit color RGB pixel. Such a pixel datum includes an 8-bit red color byte 620, an 8-bit green color byte 630 and an 8-bit blue color byte 640. Each color byte represents a color intensity between 0 and 255.

In a preferred embodiment of the present invention, filter 650 marks pixel datum 610 by setting the least significant bit of blue color byte 640 to 0 or 1, where 0 signifies protected data and 1 signifies unprotected data. Modifying the least significant bit of the blue color component only alters the appearance of the pixel datum by a small amount, and is not typically discernable to the naked eye. In this way, when the screen pixel data passed through filter 650 to video RAM 530 (FIG. 5), the protected images included within the screen displayed on display device 520 (FIG. 5) appear as unaltered original protected images. For example, the protected images surrounding the "fun That Lasts" logo in FIG. 3A appear as unaltered originals.

In a preferred embodiment of the present invention, pixel processor 570 (FIG. 5) reads the least significant bit of the blue color component of each pixel datum, to determine if the pixel datum is protected or non-protected. If the least significant bit of the blue color component is set to 0, the pixel datum is protected, and pixel processor 570 modifies it as appropriate before passing it through to computer memory 560 (FIG. 5). If the least significant bit of the blue color component is set to 1, the pixel datum is not protected, and pixel processor 570 passes it through to computer memory 560 without modification. In this way, protected image data captured from video RAM 530 is modified, but other data captured from video RAM 530 is not modified, as illustrated in FIG. 3B.

It is apparent to those skilled in the art that the method and system for marking pixel data described with reference to FIG. 6 can be readily adapted to other types of pixel data, such as 15-bit data and 16-bit data, and such as pixel data for other color systems, such as PhotoYCC, YUV, CMYK, HSV, HLS and monochrome.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method for preventing proprietary digital images from being copied from a video RAM, comprising:
   storing on a computer memory image data that is to be transmitted to a video RAM for display on a video display device, wherein the image data includes at least one portion that is proprietary data and at least one portion that is non-proprietary data;
   identifying proprietary data from the stored image data to be displayed;
   modifying least significant bits of the image data to distinguish between proprietary data and non-proprietary data; and
   transmitting the modified data to the video RAM for display on the video display device;
   wherein, if an instruction to copy the image data from the video RAM is received,
   replacing the portions of the image data that are distinguished as being proprietary data, with substitute data, based upon the least significant bits of the image data.

2. The method of claim 1 wherein the image data includes red, green and blue color values, and wherein said modifying adjusts the least significant bits of the blue color values within the image data.

3. The method of claim 1 further comprising rendering the image data in the video RAM on a video display device.

4. The method of claim 3 wherein said modifying generates modified image data that is visually similar to the stored image data, when rendered on the video display device.

5. The method of claim 1 wherein the instruction to copy the image data from the video RAM is activated by a screen capture command.

6. The method of claim 1 wherein the instruction to copy the image data from the video RAM is activated by a command to copy screen data to a clipboard.

7. The method of claim 1 wherein the proprietary data is pixel color data for at least one protected digital image.

8. The method of claim 7 further comprising downloading the at least one protected image over the Internet.

9. The method of claim 1 wherein the substitute data is encrypted image data.

10. The method of claim 9 further comprising decoding the encrypted image data.

11. The method of claim 1 wherein the stored image data is encrypted stored image data.

12. The method of claim 11 further comprising decoding the encrypted stored image data.

13. A system for protecting digital images from being copied from a video RAM, comprising:
    a first data bus through which stored image data is transmitted from a computer memory to a video RAM, the image data including at least one portion that is proprietary data and at least one portion that is non-proprietary data;
    a second data bus through which image data is copied from the video RAM to a computer memory;
    a digital filter identifying the proprietary data within the stored image data, and modifying least significant bits of the image data prior to its arrival at the video RAM on the first data bus; and
    a pixel processor distinguishing between the portions of the image data in the video RAM that are proprietary data and the portions of the image data in the video RAM that are non-proprietary data, based on the least significant bits of the image data, and replacing the portions of the image data that are distinguished as being proprietary data, with substitute data, after an instruction to copy the image data from the video RAM is received.

14. The system of claim 13 wherein the image data includes red, green and blue color values, and wherein said digital filter adjusts the least significant bits of the blue color values within the image data.

15. The system of claim 13 further comprising a video display device for rendering thereon the image data in the video RAM.

16. The system of claim 15 wherein said digital filter modifies the image data such that the modified image data is visually similar to the stored image data, when rendered on the video display device.

17. The system of claim 13 wherein said first data bus and said second data bus are distinct data busses.

18. The system of claim 13 wherein said first data bus and said second data bus are the same data bus.

19. The system of claim 13 wherein the proprietary data is color pixel data for at least one protected digital image.

20. The system of claim 19 further comprising a receiver downloading the at least one protected image over the Internet.

21. The system of claim 13 wherein the substitute data is encrypted image data.

22. The system of claim 21 further comprising a digital decoder decoding the encrypted image data.

23. The system of claim 13 wherein the stored image data is encrypted stored image data.

24. The system of claim 23 further comprising a digital decoder decoding the encrypted stored image data.

25. A method for protecting digital images from being copied from a video RAM, comprising:
    transmitting stored image data from a computer memory to a video RAM, the image data including at least one portion that is proprietary data and at least one portion that is non-proprietary data;
    identifying the proprietary data within the stored image data; and
    modifying least significant bits of the image data prior to its being received by the video RAM, thereby generating modified image data within which the portions of the image data in the video RAM that are proprietary data and the portions of the image data in the video RAM that are non-proprietary data can be distinguished from one another, based on the least significant bits of the image data.

26. The method of claim 25 wherein the image data includes red, green and blue color values, and wherein said modifying adjusts the least significant bits of the blue color values within the image data.

27. The method of claim 25 further comprising rendering the image data in the video RAM on a video display device.

28. The method of claim 27 wherein said modifying generates modified image data that is visually similar to the stored image data, when rendered on the video display device.

29. The method of claim 25 wherein the proprietary data is pixel color data for at least one protected digital image.

30. The method of claim 29 further comprising downloading the at least one protected image over the Internet.

31. The method of claim 25 wherein the stored image data is encrypted stored image data.

32. The method of claim 31 further comprising decoding the encrypted stored image data.

33. A system for protecting digital images from being copied from a video RAM, comprising:
  a data bus through which stored image data is transmitted from a computer memory to a video RAM, the image data including at least one portion that is proprietary data and at least one portion that is non-proprietary data; and
  a digital filter identifying the proprietary data within the stored image data, and modifying least significant bits of the image data prior to its arrival at the video RAM on the data bus, thereby generating modified image data within which the portions of the image data in the video RAM that are proprietary data and the portions of the image data in the video RAM that are non-proprietary data can be distinguished, based on the least significant bits of the image data.

34. The system of claim 33 wherein the image data includes red, green and blue color values, and wherein said digital filter adjusts the least significant bits of the blue color values within the image data.

35. The system of claim 33 further comprising a video display device for rendering thereon the image data in the video RAM.

36. The system of claim 35 wherein said digital filter generates modified image data that is visually similar to the stored image data, when rendered on the video display device.

37. The system of claim 33 wherein the proprietary data is pixel color data for at least one protected digital image.

38. The system of claim 37 further comprising a receiver downloading the at least one protected image over the Internet.

39. The system of claim 33 wherein the stored image data is encrypted stored image data.

40. The system of claim 39 further comprising a digital decoder decoding the encrypted stored image data.

41. A method for protecting image data located in a video RAM from being copied, comprising:
  providing image data within a video RAM, the image data including at least one portion that is proprietary data and at least one portion that is non-proprietary data, and the image data being marked such that the portions that are proprietary data and the portions that are non-proprietary data can be distinguished from one another, based on least significant bits of the image data;
  distinguishing between the portions of the image data in the video RAM that are proprietary data and the portions of the image data in the video RAM that are non-proprietary data, based on the least significant bits of the image data; and
  replacing the portions of the image data that are distinguished as being proprietary data, with substitute data, after an instruction to copy the image data from the video RAM is received.

42. The method of claim 41 wherein the instruction to copy the image data from the video RAM is activated by a screen capture command.

43. The method of claim 41 wherein the instruction to copy the image data from the video RAM is activated by a command to copy screen data to a clipboard.

44. The method of claim 41 wherein the substitute data is encrypted image data.

45. The method of claim 44 further comprising decoding the encrypted image data.

46. A system for protecting image data stored in a video RAM from being copied, comprising:
  a video RAM storing image data, the image data including at least one portion that is proprietary data and at least one portion that is non-proprietary data, and the image data being marked such that the portions that are proprietary data and the portions that are non-proprietary data can be distinguished from one another, based on least significant bits of the image data;
  a data bus, through which image data is copied from the video RAM to a computer memory; and
  a pixel processor distinguishing between the portions of the image data in the video RAM that are proprietary data and the portions of the image data in the video RAM that are non-proprietary data, based on the least significant bits of the image data, and replacing the portions of the image data that are distinguished as being proprietary, with substitute data, after an instruction to copy the image data from the video RAM is received.

47. The system of claim 46 wherein the substitute data is encrypted image data.

48. The system of claim 47 further comprising a digital decoder decoding the encrypted image data.

49. A method for protecting digital images from being copied from a video RAM, comprising:
  modifying stored image data by adjusting least significant bits of the image data so as to mark at least one portion of the image data as being protected data;
  thereafter transmitting the modified image data from a computer memory to a video RAM;
  after an instruction to copy the image data from the video RAM is received, recognizing the portions of the image data that are marked as being protected data, from the least significant bits of the image data; and
  replacing the recognized portions of the image data that are marked as being protected data, with substitute data.

50. The method of claim 49 wherein the image data includes red, green and blue color values, and wherein said modifying adjusts the least significant bits of the blue color values of the image data.

51. The method of claim 49 further comprising rendering the image data in the video RAM on a video display device.

52. The method of claim 51 wherein said modifying generates modified image data that is visually similar to the stored image data, when rendered on the video display device.

53. The method of claim 49 wherein the instruction to copy image data from the video RAM is activated by a screen capture command.

54. The method of claim 49 wherein the instruction to copy image data from the video RAM is activated by a command to copy screen data to a clipboard.

55. The method of claim 49 wherein the protected data is pixel color data for at least one protected digital image.

56. The method of claim 55 further comprising downloading the at least one protected image over the Internet.

57. The method of claim 49 wherein the substitute data is encrypted image data.

58. The method of claim 57 further comprising decoding the encrypted image data.

59. The method of claim 49 wherein the stored image data is encrypted stored image data.

60. The method of claim 59 further comprising decoding the encrypted stored image data.

61. A system for protecting digital images from being copied from a video RAM, comprising:
a first pixel processor modifying stored image data by adjusting least significant bits of the image data so as to mark at least one portion of the image data as being protected data;
a first data bus through which the modified image data is transmitted from a computer memory to a video RAM;
a second data bus, through which the image data is copied from the video RAM to a computer memory; and
a second pixel processor recognizing the portions of the image data that are marked as being protected data, from the least significant bits of the image data, and replacing the recognized portions of the image data that are marked as being protected, with substitute data, after an instruction to copy the image data from the video RAM is received.

62. The system of claim 61 wherein the image data includes red, green and blue color values, and wherein said first pixel processor adjusts the least significant bits of the blue color components values within the image data.

63. The system of claim 61 further comprising a video display device for rendering thereon the image data in the video RAM.

64. The system of claim 63 wherein said first pixel processor generates modified image data that is visually similar to the stored image data, when rendered on the video display device.

65. The system of claim 61 wherein said first data bus and said second data bus are distinct data busses.

66. The system of claim 61 wherein said first data bus and said second data bus are the same data bus.

67. The system of claim 61 wherein said first pixel processor and said second pixel processor are distinct processors.

68. The system of claim 61 wherein said first pixel processor and said second pixel processor are the same processors.

69. The system of claim 61 wherein the protected data is pixel color data for at least one protected digital image.

70. The system of claim 69 further comprising a receiver downloading the at least one protected image over the Internet.

71. The system of claim 61 wherein the substitute data is encrypted image data.

72. The system of claim 71 further comprising a digital decoder decoding the encrypted image data.

73. The system of claim 61 wherein the stored image data is encrypted stored image data.

74. The system of claim 73 further comprising a digital decoder decoding the encrypted stored image data.

* * * * *

UNITED STATES PATENT AND TRADEMARK OFFICE
CERTIFICATE OF CORRECTION

| | | |
|---|---|---|
| PATENT NO. | : 7,281,272 B1 | Page 1 of 1 |
| APPLICATION NO. | : 09/459493 | |
| DATED | : October 9, 2007 | |
| INVENTOR(S) | : Rubin et al. | |

It is certified that error appears in the above-identified patent and that said Letters Patent is hereby corrected as shown below:

On the title page

Please add -

Item (30) Foreign Application Priority Data

| Nov. 16, 1998 | (IL) .......................................... 127093 |
| Dec. 30, 1998 | (IL) .......................................... 127869 |
| Jun. 14, 1998 | (IL) .......................................... 124895 |

Signed and Sealed this

Fourth Day of October, 2011

David J. Kappos
*Director of the United States Patent and Trademark Office*